United States Patent
Deka et al.

(10) Patent No.: US 11,052,579 B2
(45) Date of Patent: Jul. 6, 2021

(54) METHOD FOR PREPARING A DENSIFIED INSULATION MATERIAL FOR USE IN APPLIANCE INSULATED STRUCTURE

(71) Applicant: Whirlpool Corporation, Benton Harbor, MI (US)

(72) Inventors: Lakshya J. Deka, Mishawaka, IN (US); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1073 days.

(21) Appl. No.: 14/961,934

(22) Filed: Dec. 8, 2015

(65) Prior Publication Data
US 2017/0157809 A1 Jun. 8, 2017

(51) Int. Cl.
*B29C 43/00* (2006.01)
*B29L 31/00* (2006.01)
(Continued)

(52) U.S. Cl.
CPC .......... *B29C 43/006* (2013.01); *B01F 7/302* (2013.01); *B29C 70/00* (2013.01); *B29C 70/58* (2013.01); *B29K 2105/04* (2013.01); *B29K 2105/165* (2013.01); *B29K 2105/251* (2013.01); *B29K 2503/08* (2013.01); *B29K 2509/00* (2013.01);
(Continued)

(58) Field of Classification Search
None
See application file for complete search history.

(56) References Cited

U.S. PATENT DOCUMENTS

| 948,541 A | 2/1910 | Coleman |
| 1,275,511 A | 8/1918 | Welch |
| (Continued) | | |

FOREIGN PATENT DOCUMENTS

| CA | 626838 A | 5/1961 |
| CA | 1320631 | 7/1993 |
| (Continued) | | |

OTHER PUBLICATIONS

Feed Machinery, Roll Mill (Year: 2013).*
(Continued)

*Primary Examiner* — Jeffrey M Wollschlager
*Assistant Examiner* — Armand Melendez
(74) *Attorney, Agent, or Firm* — Price Heneveld LLP

(57) ABSTRACT

A method for forming a vacuum insulated structure using a prepared core material includes preparing a powder insulation material defining a bulk density, pre-densifying the powder insulation material to form a pre-densified insulation base, crushing the pre-densified insulation base into granular core insulation to define a core density of the granular core insulation, disposing the granular core insulation having the core density into an insulating cavity defined within an insulating structure and expressing gas from the interior cavity of the insulating structure to further densify the granular core insulation to define a target density. The granular core insulation defines the target density disposed within the insulating structure defines the vacuum insulation structure, wherein the target density defines a density in the range of from approximately 80 grams per liter to approximately 350 grams per liter.

19 Claims, 7 Drawing Sheets

(51) Int. Cl.
  *B29C 70/58* (2006.01)
  *B01F 7/30* (2006.01)
  *B29C 70/00* (2006.01)
  *B29K 105/04* (2006.01)
  *B29K 509/00* (2006.01)
  *B29K 105/16* (2006.01)
  *B29K 503/08* (2006.01)
  *B29K 105/00* (2006.01)

(52) U.S. Cl.
  CPC .............. *B29K 2995/0015* (2013.01); *B29K 2995/0063* (2013.01); *B29L 2031/7622* (2013.01)

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 2,989,156 A * | 6/1961 | Brooks ............... F25D 23/06 220/592.27 |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schiff |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A * | 7/1987 | Barito ............... C04B 30/00 156/303.1 |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,955,675 A * | 9/1990 | Donaghy ............ B29C 44/588 312/321.5 |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Neeser et al. |
| 5,827,385 A | 10/1998 | Meyer et al. |
| 5,834,126 A | 11/1998 | Sheu |

(56) References Cited

U.S. PATENT DOCUMENTS

| | | |
|---|---|---|
| 5,843,353 A | 12/1998 | DeVos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,001,450 A * | 12/1999 | Tanimoto ............ F16L 59/065 428/69 |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A * | 10/2000 | Boes ..................... F16L 59/065 156/286 |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Asian et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B2 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hoffmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 10/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,038,403 B2 | 5/2015 | Cur et al. |

(56) References Cited

U.S. PATENT DOCUMENTS

| | | |
|---|---|---|
| 9,056,952 B2 | 6/2015 | Eilbracht et al. |
| 9,071,907 B2 | 6/2015 | Kuehl et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,182,158 B2 | 11/2015 | Wu |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0012114 A1* | 1/2004 | Eyerer ............... B29B 9/14 264/117 |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1* | 12/2004 | Hayashi ............... E04B 1/803 428/69 |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0240612 A1 | 9/2012 | Wuesthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0052393 A1* | 2/2013 | Hahn ............... E04B 1/803 428/69 |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1* | 10/2013 | Wu ............... B29C 51/02 264/101 |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |

(56) References Cited

U.S. PATENT DOCUMENTS

| | | | |
|---|---|---|---|
| 2014/0216706 A1 | 8/2014 | Melton et al. | |
| 2014/0232250 A1 | 8/2014 | Kim et al. | |
| 2014/0260332 A1 | 9/2014 | Wu | |
| 2014/0346942 A1 | 11/2014 | Kim et al. | |
| 2014/0364527 A1 | 12/2014 | Matthias et al. | |
| 2015/0011668 A1 | 1/2015 | Kolb et al. | |
| 2015/0015133 A1 | 1/2015 | Carbajal et al. | |
| 2015/0017386 A1 | 1/2015 | Kolb et al. | |
| 2015/0027628 A1 | 1/2015 | Cravens et al. | |
| 2015/0059399 A1 | 3/2015 | Hwang et al. | |
| 2015/0115790 A1 | 4/2015 | Ogg | |
| 2015/0147514 A1 | 5/2015 | Shinohara et al. | |
| 2015/0159936 A1 | 6/2015 | Oh et al. | |
| 2015/0168050 A1 | 6/2015 | Cur et al. | |
| 2015/0176888 A1 | 6/2015 | Cur et al. | |
| 2015/0184923 A1 | 7/2015 | Jeon | |
| 2015/0190840 A1 | 7/2015 | Muto et al. | |
| 2015/0224685 A1 | 8/2015 | Amstutz | |
| 2015/0241115 A1 | 8/2015 | Strauss et al. | |
| 2015/0241118 A1 | 8/2015 | Wu | |
| 2015/0285551 A1 | 10/2015 | Aiken et al. | |
| 2016/0084567 A1 | 3/2016 | Fernandez et al. | |
| 2016/0116100 A1 | 4/2016 | Thiery et al. | |
| 2016/0123055 A1 | 5/2016 | Ueyama | |
| 2016/0161175 A1 | 6/2016 | Benold et al. | |
| 2016/0178267 A1 | 6/2016 | Hao et al. | |
| 2016/0178269 A1 | 6/2016 | Hiemeyer et al. | |
| 2016/0235201 A1 | 8/2016 | Soot | |
| 2016/0240839 A1 | 8/2016 | Umeyama et al. | |
| 2016/0258671 A1 | 9/2016 | Allard et al. | |
| 2016/0290702 A1 | 10/2016 | Sexton et al. | |
| 2016/0348957 A1 | 12/2016 | Hitzelberger et al. | |
| 2017/0038126 A1 | 2/2017 | Lee et al. | |
| 2017/0157809 A1 | 6/2017 | Deka et al. | |
| 2017/0176086 A1 | 6/2017 | Kang | |
| 2017/0184339 A1 | 6/2017 | Liu et al. | |
| 2017/0191746 A1 | 7/2017 | Seo | |
| 2017/0232640 A1* | 8/2017 | Hollar, Jr. | B29B 9/08 264/331.11 |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1484563 | 10/2008 |
| EP | 2342511 | 8/2012 |
| EP | 2543942 A2 | 1/2013 |
| EP | 2607073 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 03013779 | 1/1991 |
| JP | 404165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07144955 | 6/1995 |
| JP | H07167377 | 7/1995 |
| JP | 08300052 | 11/1996 |
| JP | H08303686 | 11/1996 |
| JP | H09166271 | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 A | 11/2000 |
| JP | 2001038188 | 2/2001 |
| JP | 2001116437 | 4/2001 |
| JP | 2001116443 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 03478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161834 A | 6/2006 |
| JP | 2006161945 | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |

(56) References Cited

FOREIGN PATENT DOCUMENTS

| | | |
|---|---|---|
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 | 5/1996 |
| WO | 9614207 A1 | 5/1996 |
| WO | 9721767 | 6/1997 |
| WO | 1998049506 | 11/1998 |
| WO | 02060576 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 | 8/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™," web page, 2 pages, date unknown, http://product-finder.basf.com/group/corporate/product-finder/en/brand/BALINDUR, at least as early as Dec. 21, 2015.
PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, at least as early as Dec. 21, 2015.
Kitchen Aid, "Refrigerator User Instructions," 120 pages, published Sep. 5, 2015.
Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.

* cited by examiner

METHOD FOR PREPARING A DENSIFIED INSULATION MATERIAL FOR USE IN APPLIANCE INSULATED STRUCTURE

BACKGROUND

The device is in the field of insulating materials, specifically, insulating materials that can be densified for use in insulating structures for household appliances.

SUMMARY

In at least one aspect, a method for forming a vacuum insulated structure using a prepared core material includes preparing a powder insulation material defining a bulk density, pre-densifying the powder insulation material to form a pre-densified insulation base and crushing the pre-densified insulation base into granular core insulation to define a core density of the granular core insulation. The granular core insulation having the core density is then disposed into an insulating cavity defined within an insulating structure. Gas is expressed from the interior cavity of the insulating structure to further densify the granular core insulation to define a target density. The granular core insulation defines the target density disposed within the insulating structure that defines the vacuum insulation structure, wherein the target density defines a density in the range of from approximately 80 grams per liter to approximately 350 grams per liter.

In at least another aspect, a method for forming a vacuum insulated appliance cabinet using a prepared core material includes preparing a powder insulation material defining a bulk density, pre-densifying the powder insulation material to form a pre-densified insulation base and crushing the pre-densified insulation base into granular core insulation to define a core density of the granular core insulation. An appliance structure is provided having an outer wrapper and an inner liner, the outer wrapper and inner liner defining an insulating cavity therebetween. The granular core insulation having the core density is disposed into the insulating cavity. The insulating cavity of the appliance structure is sealed to contain the granular core insulation therein and expressing at least a portion of the gas is expressed from within the insulating cavity to form a vacuum insulated structure.

In at least another aspect, a method of preparing a core material for installation into an insulated structure includes blending a plurality of insulating components to form a powder insulation material having a bulk density, wherein the insulating components include at least one of silica, aerogel, glass fibers, and glass spheres. The powder insulation material is pre-densified to form a pre-densified insulation base and the pre-densified insulation base is then crushed to define a granular core insulation having a core density, wherein the core density is different than the bulk density and the core density is in the range of from approximately 80 grams per liter to approximately 350 grams per liter.

These and other features, advantages, and objects of the present device will be further understood and appreciated by those skilled in the art upon studying the following specification, claims, and appended drawings.

DETAILED DESCRIPTION OF EMBODIMENTS

Figure 1:
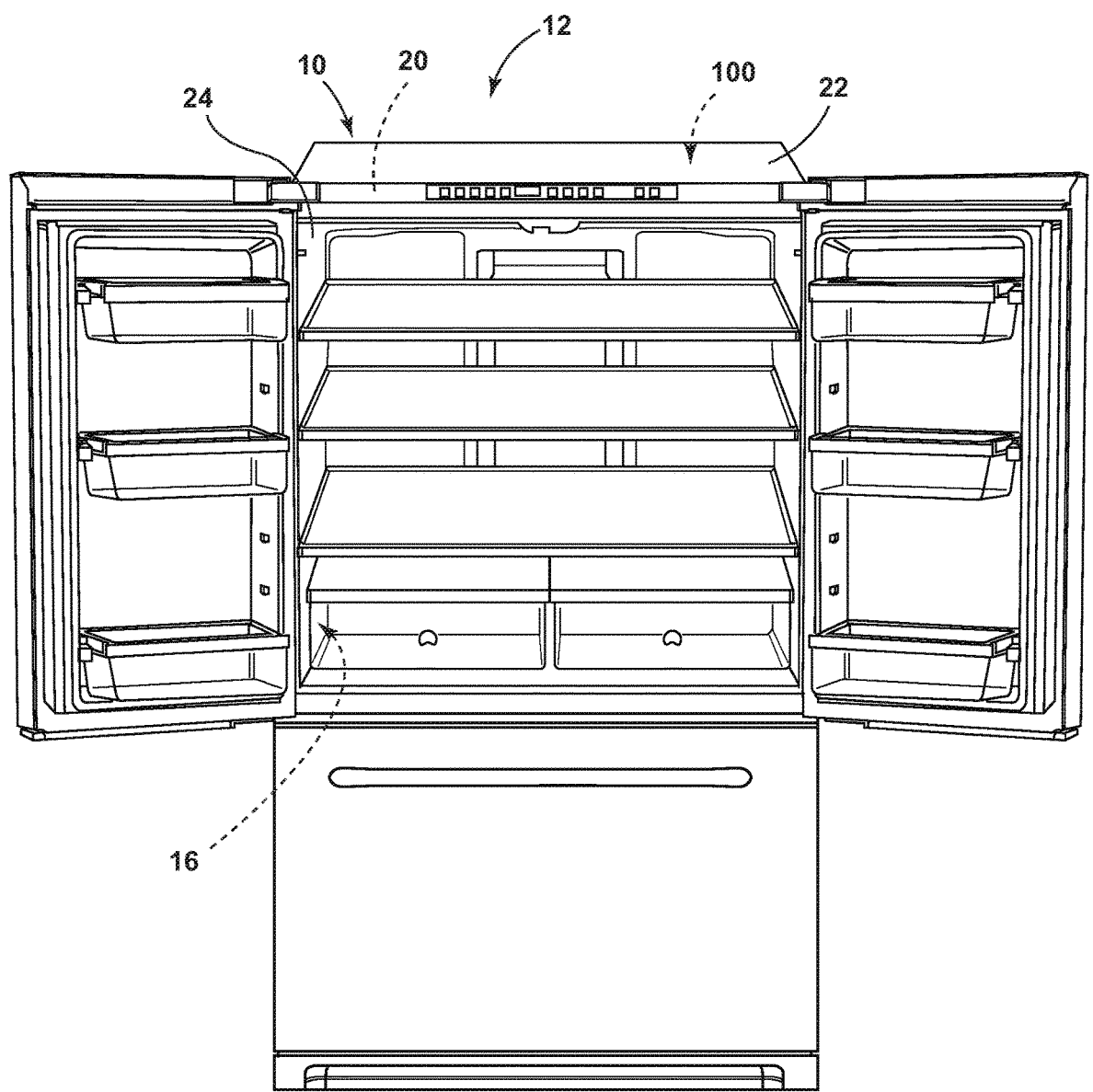
FIG. 1 is a front perspective view of a refrigerating appliance incorporating an aspect of the granular core insulation disposed within an insulating structure of the appliance.
Figure 2:
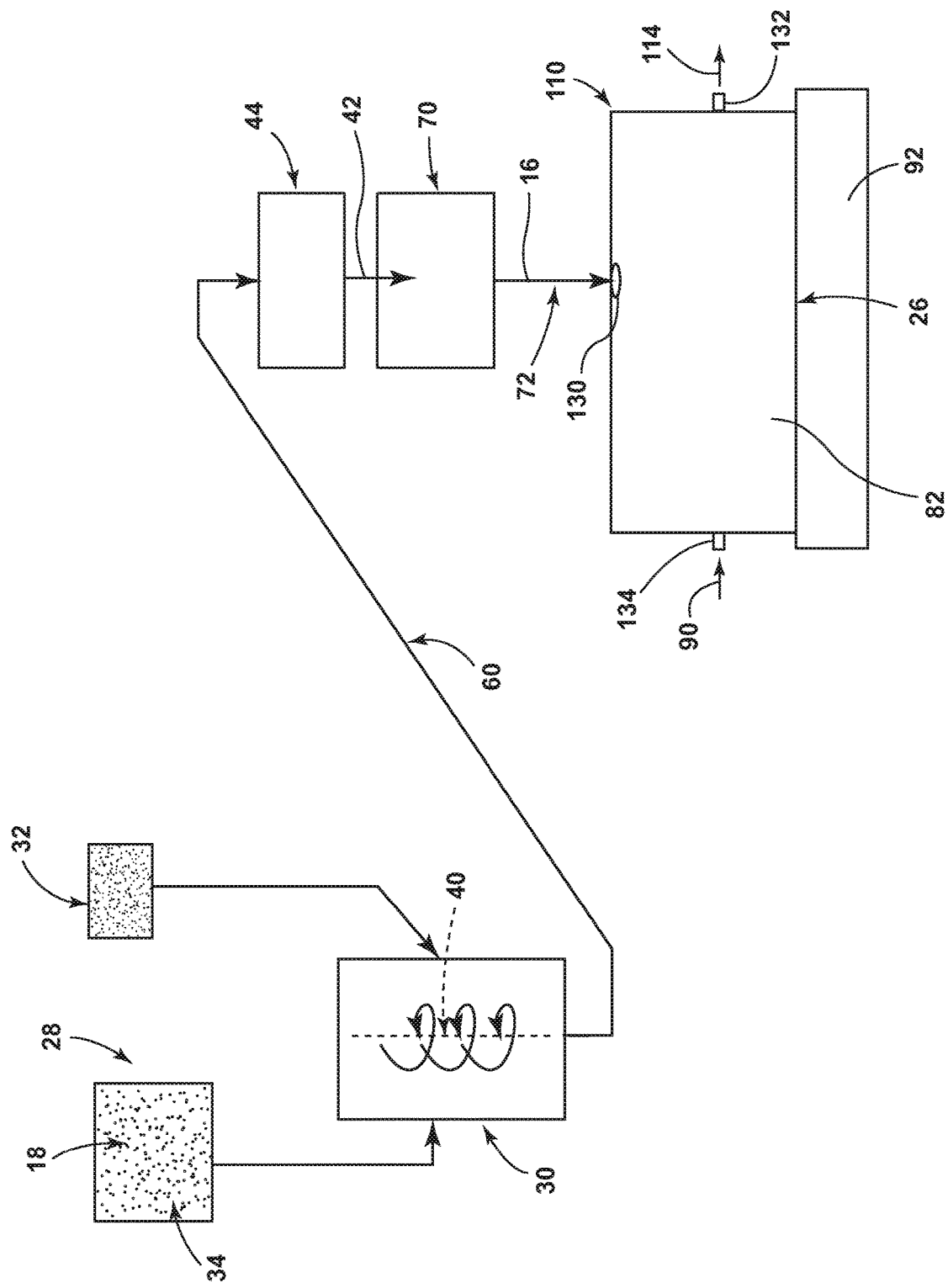
FIG. 2 is a schematic flow diagram illustrating an exemplary process for forming an aspect of the granular core insulation.
Figure 3:
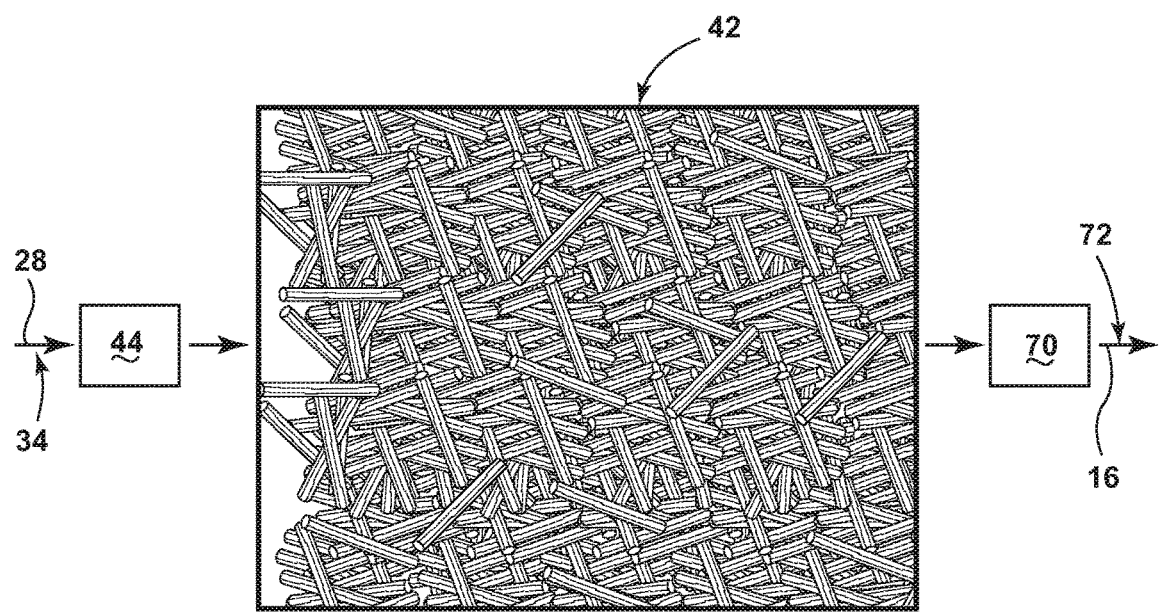
FIG. 3 is a top perspective view of an exemplary form of a pre-densified insulation base achieved after conducting a pre-densifying step of an exemplary process for forming the granular core insulation.
Figure 4:
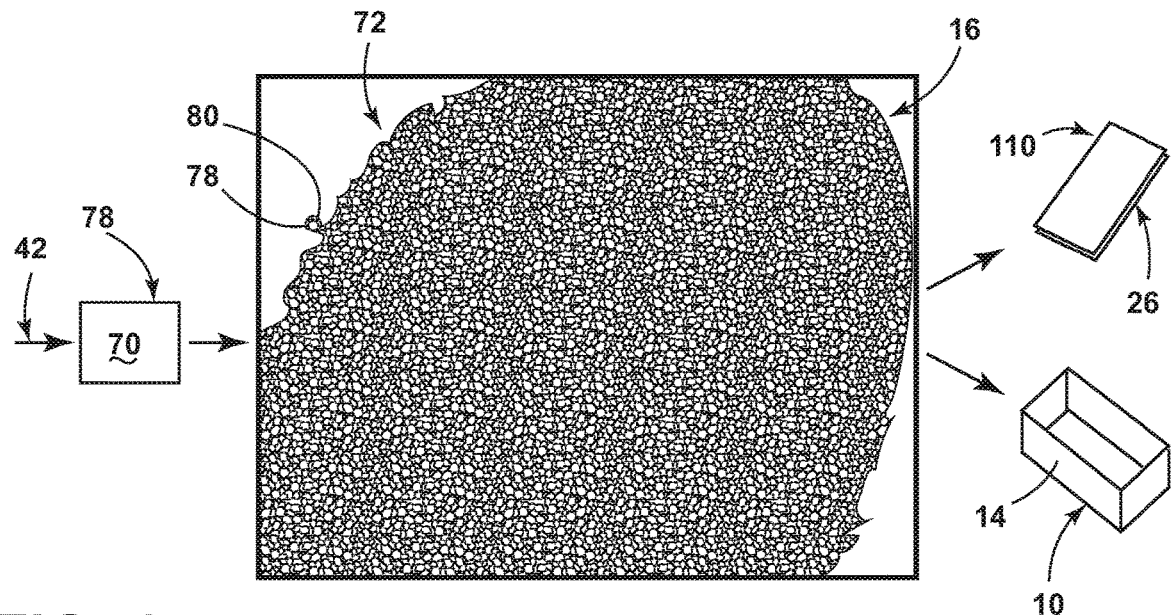
FIG. 4 is a perspective view of a crushed form of the precompacted insulation base of FIG. 3.
Figure 5:
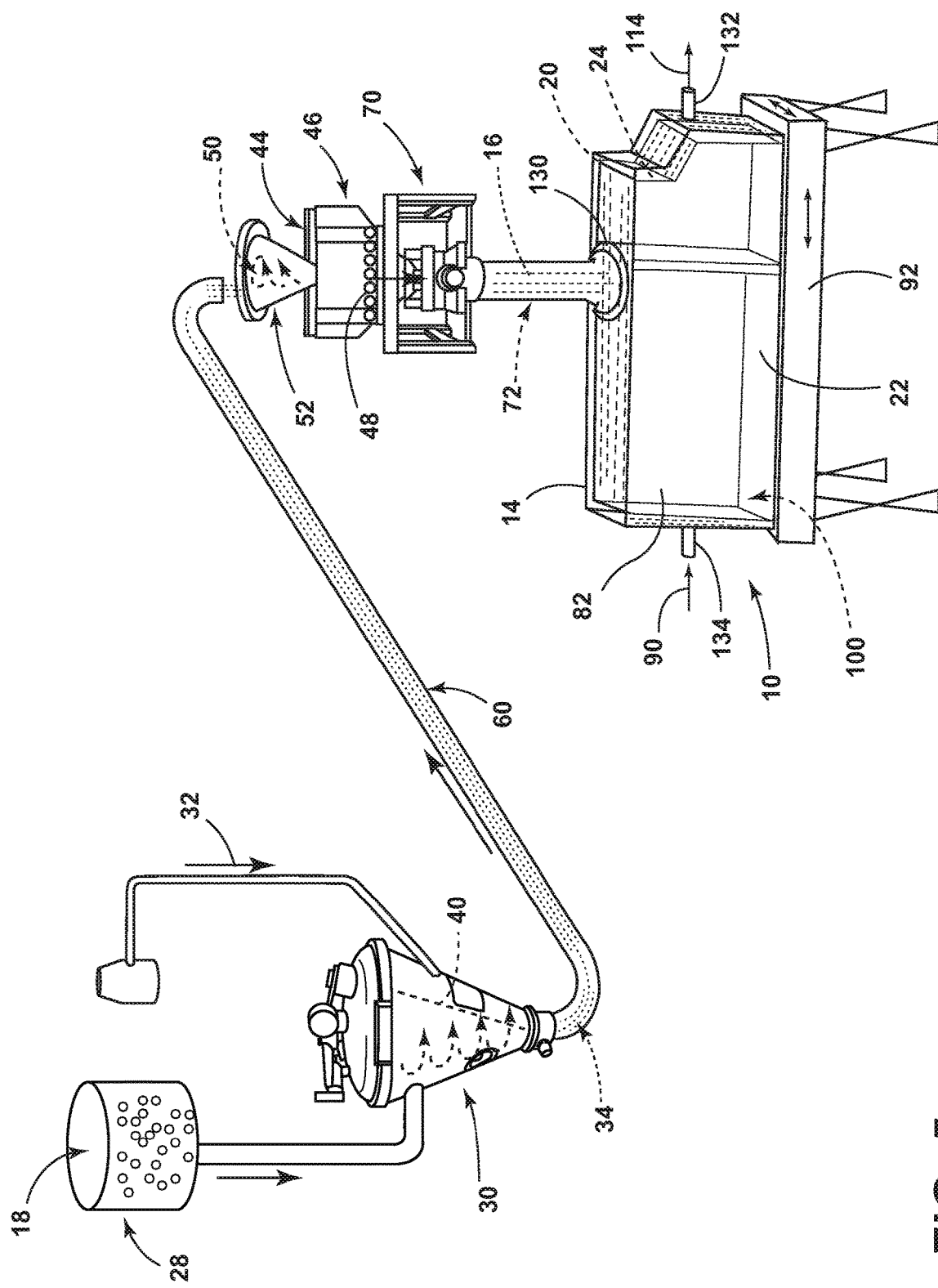
FIG. 5 is a schematic diagram illustrating an exemplary mechanism for performing an aspect for a method for forming the granular core insulation and forming an insulating structure for an appliance.
Figure 6:
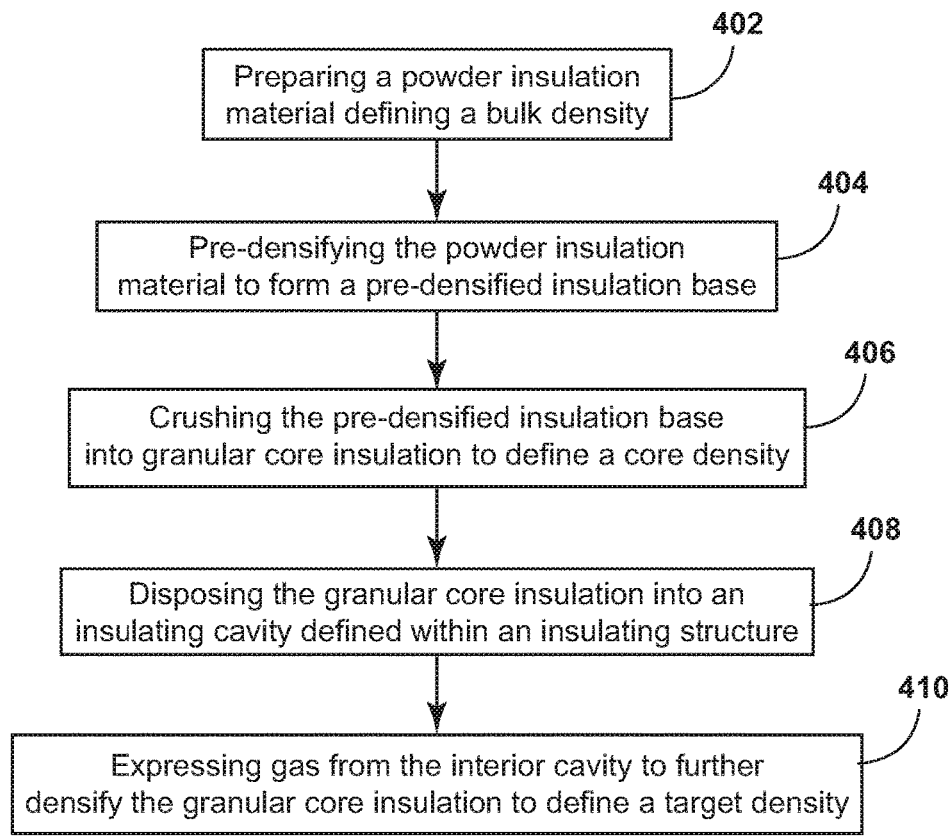
FIG. 6 is a schematic flow diagram illustrating a method for forming a vacuum insulated structure using a prepared core material.
Figure 7:
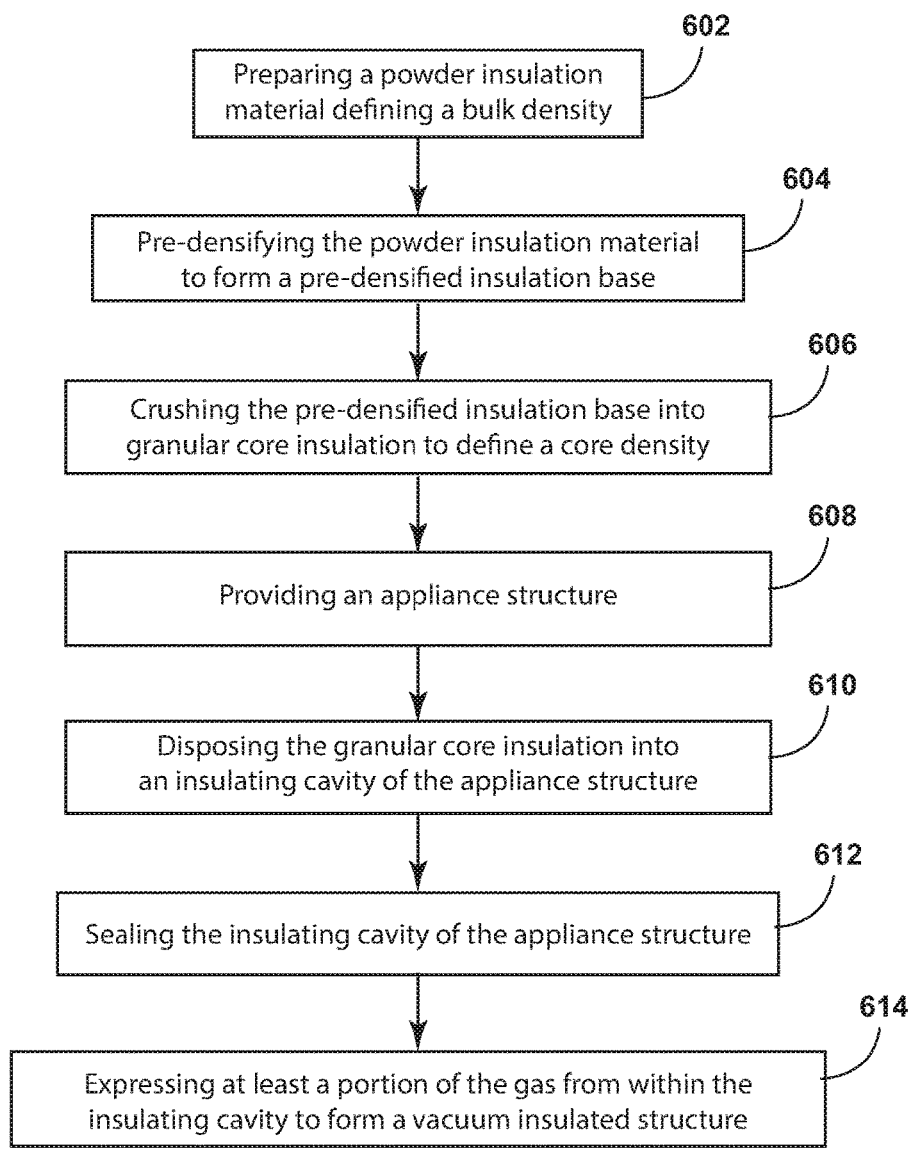
FIG. 7 is a schematic flow diagram illustrating an aspect of a method for forming a vacuum insulated appliance cabinet using a prepared core material.
Figure 8:
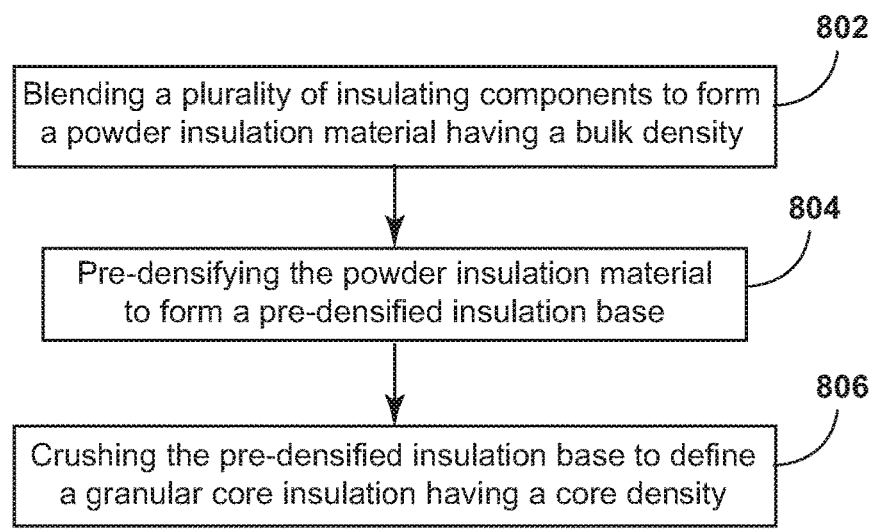
FIG. 8 is a schematic flow diagram illustrating an aspect of a method for preparing a core insulation material for installation into an insulated structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-5, reference numeral 10 generally refers to a vacuum insulated structure that is disposed within an appliance 12, such as a refrigerator, freezer, dishwasher, water heater, laundry appliance, oven, or other similar appliance or fixture that requires thermal and/or acoustical insulation within an insulated structure 14. Disposed within the insulated structure 14 is a granular core insulation 16 that includes a densified form of a powder insulation material 18. The granular core insulation 16 can be disposed directly into the insulating structure for the appliance 12, such as within an insulating cavity 20 defined between an outer wrapper 22 and an inner liner 24 of the appliance 12. Alternatively, the granular core insulation 16 can be installed within an insulating panel that is then installed as a panel member 26 within the insulating cavity 20 of the insulating structure of the appliance 12.

According to the various embodiments, as exemplified in FIGS. 1-5, the granular core insulation 16 can be prepared, according to at least one aspect, by placing a base insulation 28 into a blending apparatus 30 and combining the base insulation 28 with various additives 32 that can include, but are not limited to, various opacifiers such as carbon black, silicon carbides, titanium oxides, reinforcing materials, such as organic/inorganic fibers and organic/inorganic insulating spheres. The base insulation 28 can include various materials that can include, but are not limited to, fumed silica, precipitated silica, aerogel nano powder, silica fume, inorganic microspheres, organic microspheres, perlite, rice husk ash, diatomaceous earth and combinations thereof, and other similar powder materials suitable for vacuum insulation structures. The blending apparatus 30 combines these various materials to form the powder insulation material 18 having a bulk density 34. It is contemplated that the powder insulation material 18 can be a nano-porous silica blend micro agglomerate having particle agglomerate sizes that are approximately 1 micron, although other larger and smaller agglomerate sizes are contemplated. The bulk density 34 of the powder insulation material 18 can be within the range of approximately 30 grams/liter to approximately 150 grams/liter. It is contemplated that greater and lesser bulk densities can be achieved depending upon the base insulation 28 and additives 32 included within the blending apparatus 30 to form the powder insulation material 18. The degree of blending, the types of additives 32, types of base insulation 28, and other factors can cause variations in the density of the powder insulation material 18.

Referring again to FIGS. 2-5, undensified silica materials and the one or more opacifiers, and other blend materials, are included within the blending apparatus 30. It is contemplated that where an opacifier is used, the opacifier within the powder insulation material 18 can be from approximately 5% to approximately 40% of the total weight of the material disposed within the blending apparatus 30. The opacifier is added to reduce radiation conduction of the silica mix. This reduction can be within the range of approximately 0.5 mw/mk to 2.0 mw/mk. It is contemplated that the blending apparatus 30 for performing the blending and/or mixing may or may not include an intensifier 40. The intensifier 40 can take various forms that can include various supplemental mixing mechanisms, injectors, combinations thereof, or other similar supplemental mechanisms that intensify the blending/mixing operations of the blending apparatus 30. An exemplary blending apparatus 30 can include a Hosokawa Vrieco-Nauta® with an intensifier 40 or any commercially available high shear mixer such as a V-block tubing mixer, a Ross mixer or similar mixer can be used to prepare this blend. Regardless of the blending apparatus 30 used, the blending apparatus 30 can be run for varying periods of time, where the blending time can depend upon the mixture volume, the various additives 32 included within the powder insulation material 18, and other factors.

Referring again to FIGS. 2-5, in order to achieve the proper density of the granular core insulation 16, the undensified powder insulation material 18 is first compacted by varying means into flakes or blanks or other densified or compacted particles of a pre-densified insulation base 42. These compacted flakes or blanks that form the pre-densified or compacted insulation base 42 have a density greater than that of the granular core insulation 16 that will be disposed within the insulated structure 14. This pre-densifying process can be accomplished by various compacting mechanisms 44, one such exemplary compacting mechanism 44 being a roller compactor 46 such as an APC L 200-50 from Hosokawa. It is contemplated that other compacting mechanisms 44 can be used to perform the pre-densifying steps of the various methods for forming the granular core insulation 16, such as vacuum compactors, presses, and others. Where a roller compactor 46 is used, the compactor may include a series of rollers 48 that serve to compact and densify the powder insulation material 18 between the rollers 48 into the blanks or flakes of the pre-densified insulation base 42 (exemplified in FIG. 3). It is contemplated, according to various aspects of the device, that during the compaction process, the powder insulation material 18 is conveyed into a roller gap of the roller compactor 46 by a cylindrical feeding auger 50 having a conical feed zone 52. Higher yield through the auger 50 can be achieved by including a vacuum de-aeration system within the feeding auger 50. The vacuum de-aeration system may be used at a base of the auger 50 or along the sides of the housing extending around the auger 50. In various embodiments, a lining can be placed on the sides proximate auger 50. Such lining can include a filter media, which may be made of various materials that include, but are not limited to, paper, synthetic material, composite or metal. It is contemplated that the use of the vacuum assist feature of the de-aeration system can serve to increase the compressive strength of the compacted/densified material.

Referring again to FIGS. 2-5, it is contemplated that delivery of the powder insulation material 18 from the blending apparatus 30 to the compacting mechanism 44 can be performed by various delivery systems 60 that can include, but are not limited to, a pumping system, a pneumatic or vacuum conveying system, belt systems, gravity fed systems, flexible screw conveying systems, combinations thereof, and other material delivery systems 60 that can deliver the powder insulation material 18 having a very minimal density.

Referring again to FIGS. 2-5, the pre-densified insulation base 42 formed through the compacting mechanism 44 can be delivered to a crushing apparatus 70 for conversion into an aspect of the granular core insulation 16. Various pressing forces can be applied to the pre-densified insulation base 42 to arrive at a granular core insulation 16 having various densities. By way of example, and not limitation, it has been found that a pressing force of 18 kN results in a core density 72 of the granular core insulation 16 of approximately 173 grams/liter. By reducing this pressing force, or by increasing the speed of the rolls through the crushing apparatus 70, granules 78 of different core density 72 can be achieved. Such core densities 72 can include ranges from approximately 80 grams/liter to 350 grams/liter. It is contemplated that depending upon the desired density of the granular core insulation 16, greater or lesser core densities 72 can be achieved by varying the pressing force from the crushing apparatus 70 or the speed at which the material moves through the crushing apparatus 70.

According to various embodiments, various other mechanisms can be used in conjunction with, or instead of, the crushing apparatus 70 to transform the pre-densified insulation base 42 into the granular core insulation 16. Such mechanisms and processes can include grinders, blenders, mixers, mills, flake crushers, combinations thereof, and other similar mechanisms that can at least partially break down the pre-densified insulation base 42.

According to the various embodiments, after the material for the granular core insulation 16 is generated through operation of the crushing apparatus 70, each granule 78 of the granular core insulation 16 can be coated by one or more binders 80 that can serve to increase the compressive strength of each granule 78. Such binders 80 can include, but are not limited to, binders that include various cellulose, wax, polyethylene glycol, gelatin, starch, polyvinyl alcohol, polymethacrylates, graphites, sodium silicates, various other organic and/or inorganic materials, and other similar materials that can serve to increase the compressive strength of each granule 78 of the granular core insulation 16. The use of the binders 80 can serve to prevent deflection of the walls 82 of the insulated structure 14 during various compacting and/or gas expressing operations. The maximum size of the individual granules 78 for the granular core insulation 16 can be controlled by the inclusion of a screen having a particular mesh size within or proximate the crushing apparatus 70, or by controlling the distance between the mills. Through the various aspects of the processes disclosed herein, granule 78 sizes between 300 nm to 5 mm can be achieved. The granules 78 on the higher size range can have increased compressive strength that can also add to the overall compressive strength of the granular core material 16. The various aspects of the process disclosed herein may produce certain fines or undensified/uncompacted material that was not densified into a granular form. This material can be captured and disposed back into a hopper or the blending apparatus 30 to be processed again.

Referring again to FIGS. 1-5, in forming the granular core insulation 16, it is contemplated that certain additives 32 can be included within the granular core insulation 16 to vary the density, and also modify the insulating properties of the granular core insulation 16. Such additives 32 can include, but are not limited to, insulating gas 90, such as argon, neon, carbon dioxide, xenon, krypton, combinations thereof, and other similar insulating gasses, insulating glass spheres, such as microspheres, nanospheres, hollow spheres, and other forms of insulating organic/inorganic spheres, additional powdered insulation material and other insulating materials. It is contemplated that the additives 32 can be included within the granular core insulation 16 such that an insulating material occupies substantially all of the space within the insulating cavity 20 of the insulated structure 14 when the granular core insulation 16, and the additives 32 are included within the insulating cavity 20 of the insulated structure 14. To assist with the deposition of the granular core insulation 16 and the various additives 32 within the insulated structure 14, various vibrating mechanisms 92 can be implemented to position the various materials in a packed configuration with minimal spaces between particles. Such a vibrating mechanism 92 can be a vibration table that vibrates the entire insulated structure 14. It is contemplated that vibration with low frequency and high impact may yield higher efficiency or better packing of the granular core material 16 within the insulating cavity 20. More efficient packing can serve to increase the compressive strength of the granular core material 16. Alternatively, the vibrating mechanism 92 can be an apparatus that is temporarily placed within the insulating cavity 20 to directly vibrate the various particles of the granular core insulation 16 and the various additives 32.

Referring again to FIGS. 2-5, once the granular core insulation 16 is prepared, it may be necessary to dry the granular core insulation 16 before being disposed within an insulated structure 14 or before being transported to another location for use in any one of various applications. When the granular core insulation 16 is dried and prepared for installation into the insulated structure 14, the granular core insulation 16 can be directly fed into the insulating cavity 20 of the insulated structure 14. By way of example, and not limitation, the granular core insulation 16 can be fed directly into the insulating space defined between an inner liner 24 and an outer wrapper 22 of an insulated structure 14 for an appliance 12. Alternatively, the granular core insulation 16 can be disposed within the insulating cavity 20 of a panel member 26, such that the granular core insulation 16 within the panel member 26 can be formed into a vacuum insulation panel that can be, in turn, installed within the insulating cavity 20 of the insulation structure of an appliance 12. Disposing techniques such as a double diaphragm powder pump, an auger feed, and a flexible screw conveyor can also be used.

Referring now to FIGS. 2-6, having described the process for forming the granular core insulation 16, a method 400 is now disclosed for forming a vacuum insulated structure 10 using a prepared core material, such as the granular core insulation 16. According to the method 400, a powdered insulation material defining a bulk density 34 is prepared. As discussed above, preparation of the powder insulation material 18 can be through the use of a blending apparatus 30, where the powder insulation material 18 includes various insulating materials that can include, but are not limited to, various silica powder, aerogel powder, organic/inorganic fibers, and organic/inorganic micro-nano spheres, perlite, rice husk ash, diatomaceous earth, and other similar powder type insulation materials (step 402). Once the powder insulation material 18 is prepared, the powder insulation material 18 is pre-densified/compacted to form a pre-densified insulation base 42 (step 404). The pre-densifying step can be accomplished by various compacting operations, such as by a roller compactor 46 or a briquetting machine, vacuum packing, mechanical pressing, or other apparatus that can provide a compressive force against the powder insulation material 18 to form the pre-densified insulation base 42. After forming the pre-densified insulation base 42, the pre-densified/compacted insulation base 42 is crushed into the granular core insulation 16 to define a core density 72 of the granular core insulation 16 (step 406).

According to the various embodiments, the various densifying and pre-densifying steps of the methods disclosed herein can take the form of any one or more processes through which the base insulation 28 is processed into the granular core insulation 16. Such densification processes can include compaction, pressing, rolling, or other similar application of a positive compressive force. It is also contemplated that the densification of the base insulation 28 into the granular core insulation 16 can be accomplished through the extraction of gas, vacuum packing, or other similar application of a negative compressive force. Combinations of the positive and negative compressive forces can also be implemented to form the pre-densified insulation base 42 and/or the granular core insulation 16.

According to the various embodiments, the core density 72 can be less than a target density 100 of the granular core insulation 16. It is contemplated that the core density 72 of the granular core insulation 16 can be provided such that further and finite densification of the granular core insulation 16 can take place during subsequent steps of the process of forming the vacuum insulated structure 10.

Once the granular core insulation 16 having the core density 72 is prepared, the granular core insulation 16 is disposed within an insulating cavity 20 defined within an insulated structure 14 (step 408). As discussed above, the insulated structure 14 can be an insulating structure for an appliance cabinet made from an inner liner 24 and an outer wrapper 22. The insulated structure 14 can also be a panel member 26 that can be used to form a vacuum insulated panel 110 for separate installation within the insulating cavity 20 of the insulated structure 14 for the appliance 12 (step 408). It is contemplated that once the granular core insulation 16 is disposed within the insulating cavity 20, gas 114 can be expressed from the interior cavity of the insulated structure 14 to form the vacuum insulated structure 10 (step 410). As discussed above, further densification of the granular core insulation 16 can occur as gas 114 is being expressed from the interior cavity. In this manner, the granular core insulation 16 having the core density 72, can be further densified into the target density 100 of the granular core insulation 16.

According to the various embodiments, it is contemplated that as gas 114 from within the insulating cavity 20 is expressed, an insulating gas 90 can be injected into the interior cavity, such that the insulating gas 90 replaces air or some other gas 114 having lesser insulating characteristics than the insulating gas 90. Where the insulating gas 90 is injected as the lesser insulating gas 90 is being expressed, it is contemplated that the expression of gas 114 from the interior cavity may not result in further densification of the granular core insulation 16. In such an embodiment, it is contemplated that the crushing step 406 of the pre-densified insulation base 42 into the granular core insulation 16 can result in the core density 72 being substantially similar to the target density 100 desired for the design of the insulated structure 14 of the appliance 12.

Referring again to FIGS. 2-5, it is contemplated that the insulated structure 14 can include the interior insulating cavity 20 and can also include an insulation inlet 130 and a vacuum outlet 132. In such an embodiment, the insulation inlet 130 can be used to dispose the granular core insulation 16, as well as various additives 32, within the interior insulating cavity 20 of the insulated structure 14. Once the proper amount of granular core insulation 16 and additives 32 are installed therein, the insulation inlet 130 can be sealed. The vacuum outlet 132 of the insulated structure 14 can be used, as discussed above, to express gas 114 from the interior cavity of an insulated structure 14. The gas inlet 134 can also be included where the gas inlet 134 provides a conduit through which the insulating gas 90 can be injected as the lesser insulating gas 90 is expressed. Once the various gas injecting/gas expressing steps are completed, each of the gas inlet 134 and vacuum outlet 132 are sealed, thereby hermetically sealing the insulated structure 14 to prevent the dissipation or other loss of insulating gas 90.

Referring now to FIGS. 2-5 and 7, a method 600 is also disclosed for forming an insulated structure 14 in the form of a vacuum insulated cabinet using a prepared core material such as the granular core insulation 16. According to the method 600, the base insulation 28, typically a powder, is prepared, substantially as described above, to create the powder insulation material 18 having the bulk density 34 (step 602). The powder insulation material 18 is then pre-densified to form the pre-densified insulation base 42 (step 604). The pre-densified insulation base 42 is then crushed into the granular core insulation 16 to define either the core density 72 or the target density 100 for the granular core insulation 16 (step 606). As discussed above, the core density 72 of the granular core insulation 16 may be less than the target density 100 of the granular core insulation 16 where further densifying steps may be performed upon the granular core insulation 16 before the vacuum insulated structure 10 is completed. Such further densifying steps, as discussed above, can include, but are not limited to, compressing the granular core insulation 16 through the expression of gas 114 from the interior cavity, further physical compression of the granular core insulation 16 and/or placing of additives 32 within the granular core insulation 16. Where additives 32 are used, the additives 32 can include, but are not limited to, organic/inorganic hollow spheres, perlite, rice husk ash, diatomaceous earth with binders and opacifiers, insulating gas 90, glass fiber, additional powder insulation material 18 in an uncompacted form, or other similar insulation material.

Referring again to FIGS. 2-5 and 7, according to the method 600, an insulating appliance structure of an appliance 12 made from an outer wrapper 22 and an inner liner 24 can be provided (step 608). The outer wrapper 22 and inner liner 24 are sealed together to define an insulating cavity 20 therebetween. The granular core insulation 16 having either the core density 72 or the target density 100 is then disposed into the insulating cavity 20 of the appliance structure (step 610). The insulating cavity 20 is then sealed at the insulation inlet 130 such that only gas 114 can be injected into or removed from the insulating cavity 20 via the vacuum inlet and/or vacuum outlet 132 (step 612). After the proper amount of granular core insulation 16 is disposed within the insulating cavity 20, at least a portion of the gas 114 is expressed from within the insulating cavity 20 to form a vacuum insulated structure 10 (step 614). As discussed above, as gas 114 is expressed from the insulating cavity 20, insulating gas 90 can be injected into the insulating cavity 20 such that the insulating gas 90 replaces the gas 114 being expressed. Sealing of the insulating cavity 20 is necessary as the insulating gas 90 will disperse, dissipate, or otherwise escape, from the insulating cavity 20 to the atmosphere through any unsealed portion of the insulated structure 14.

According to the various embodiments, the granular core insulation 16 can include one or more binders 80 to increase the compressive strength of each granule 78 of the granular core insulation 16. The increased compressive strength of each granule 78 can serve to prevent deflection of the outer wrapper 22 and/or the inner liner 24 during compression of the granular core insulation 16 and/or as gas 114 is being expressed from the insulating cavity 20 during formation of the vacuum insulated structure 10. The increased compressive strength of the granular core insulation 16, at least partially, withstands the inward deflection of the outer wrapper 22 and inner liner 24 to maintain a substantially consistent thickness of the insulating cavity 20 of the vacuum insulated structure 10.

According to the various embodiments, the inner liner 24 and outer wrapper 22 of the appliance structure can be made of various rigid materials that can form a hermetic seal when attached together. Typically, both the inner liner 24 and outer wrapper 22 will be made of the same material, such as both being metal, both being a high barrier polymer-type material, or other similar material that can be hermetically sealed together. It is also contemplated, that in various embodiments, the outer wrapper 22 can be metal and the inner liner 24 can be plastic, or vice versa, or the outer wrapper 22 and inner liner 24 can be made of various other similar or differing materials that can be hermetically sealed together to form the vacuum insulated structure 10.

Referring now to FIGS. 2-5 and 8, a method 800 is disclosed for preparing a core insulation material for installation into an insulated structure 14. According to the method 800, a plurality of insulating components are blended to form a powder insulation material 18 having a bulk density 34 (step 802). As discussed above, these insulating components can include at least one of silica powder, aerogel powder, organic/inorganic fibers, and organic/inorganic micro-nano spheres, perlite, rice husk ash, diatomaceous earth with opacifiers like carbon black and silicon carbide as well as with some binders that include various cellulose, wax, polyethylene glycol, gelatin, starch, polyvinyl alcohol, polymethacrylates and other organic materials as well as inorganic material such as sodium silicates. The powder insulation material 18 is then pre-densified to form a pre-densified insulation base 42 (step 804). The pre-densified insulation base 42 is then crushed to define a granular core insulation 16 having a core density 72, where the core density 72 is more dense than the bulk density 34 (step 806).

According to the various aspects of the methods disclosed herein, it is contemplated that an insulating gas carrier 90 can be used to assist in the movement of the base insulation 28 through the blending apparatus 30, the delivery system 60, the compacting mechanism 44 and/or the crushing apparatus 70. In such an embodiment, it is further contemplated that at least the blending apparatus 30, compacting mechanism 44 and the crushing apparatus 70 can be housed within a closed system. This closed system can include various inlet and outlet valves through which gas 114 and insulating gas 90 can be injected and/or expressed. Through the use of insulating gasses 90, the base insulation 28, and ultimately the granular core insulation 16 can be delivered from the closed system of the blending apparatus 30, compacting mechanism 44 and the crushing apparatus 70 into the insulating cavity 20 of the insulated structure 14. The transport of the granular core insulation 16 into the insulating cavity 20 is assisted by the flow of the insulating gas 90 and the insulating gas 90 is thereby delivered into the insulating cavity 20 to act as an additional insulating material. The insulating gas 90 can include, but is not limited to, argon, krypton, neon, carbon dioxide, xenon, combinations thereof and other insulating gasses 90.

According to the various embodiments, it is contemplated that the granular core insulation 16 can then be installed within an insulated structure 14, such as an appliance cabinet, vacuum insulating panel, or other similar insulating structure. It is also contemplated that the granular core insulation 16 can then be packaged for shipment to other locations for use in varying applications.

According to the various embodiments, it is contemplated that the granular core insulation 16 can be used during the manufacture of various fixtures and/or appliances 12 requiring at least some insulation. Such appliances 12 can include, but are not limited to, water heaters, ductwork, fluid piping, household wall/roof insulation, vehicle insulation, insulation for various household and commercial appliances, and other similar applications. Typically, the granular core insulation 16 will be used for household appliances that can include, but are not limited to, refrigerators, freezers, dishwashers, laundry appliances, ovens, water heaters and other similar household appliances. Additionally, it is contemplated that the granular core insulation 16 can be directly installed within the insulating cavity 20 for an appliance cabinet without using additional barrier films, vapor barriers, or other sealing mechanisms. In such an embodiment, the granular core insulation 16 is installed directly within the insulating cavity 20 defined between the outer wrapper 22 and inner liner 24 of the insulating structure for the appliance 12. It is also contemplated that the granular core insulation 16 can be fed into a flexible vacuum envelope or bag to make a two-dimensional or three-dimensional vacuum insulated panel 110 that can be later installed within the insulated structure 14 for the appliance 12. It is also contemplated that the insulated structures 14 for appliances 12 can include structures for the cabinet, doors, door panels, drawers, and other components of the appliance 12.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for forming a vacuum insulated structure using a prepared core material, the method comprising steps of:

preparing a powder insulation material defining a bulk density;

pre-densifying the powder insulation material using a roller compactor to form a pre-densified insulation base;

crushing the pre-densified insulation base into core insulation, using a crushing apparatus having a plurality of crushing rollers, to define a core density of the core insulation, wherein during the pre-densifying and crushing steps, particles of the powder insulation material are adhered together to form the pre-densified insulation base and the core insulation;

disposing the core insulation having the core density into an insulating cavity defined within an insulating structure, wherein the core density of the core insulation is greater than the bulk density of the powder insulation material; and expressing gas from an interior cavity of the insulating structure to further densify the core insulation to define a target density, wherein the core insulation defining the target density disposed within the insulating structure defines the vacuum insulated structure, wherein the target density defines a density in a range of from approximately 80 grams per liter to approximately 350 grams per liter, wherein:
the target density is greater than the core density;
the core insulation is in a form of a granular core insulation;
a binder is added to the granular core insulation; and
the binder coats a majority of an outer surface of granules of the granular core insulation and increases a compressive strength of each granule of the granular core insulation.

2. The method of claim 1, wherein the insulating structure includes the interior cavity and an insulation inlet and a vacuum outlet, the insulation inlet and the vacuum outlet defining communication between the interior cavity and an exterior of the insulating structure.

3. The method of claim 1, further comprising the step of:
disposing an additive within the core insulation, wherein the additive includes at least one of insulating gas, insulating fibers, insulating spheres and binders.

4. The method of claim 1, wherein the step of preparing the powder insulation material includes blending together a plurality of insulating components, where the plurality of insulating components include at least one of silica powder, aerogel powder, insulating fibers, insulating spheres, perlite, rice husk ash, diatomaceous earth and opacifiers.

5. The method of claim 1, wherein the vacuum insulated structure is an appliance cabinet.

6. The method of claim 5, wherein the appliance cabinet includes an inner liner and an outer wrapper and the insulating cavity is defined between the inner liner and the outer wrapper.

7. The method of claim 1, wherein the vacuum insulated structure is a vacuum insulated panel.

8. The method of claim 1, wherein the bulk density is defined by a density within a range of from approximately 30 grams per liter to approximately 150 grams per liter.

9. A method for forming a vacuum insulated appliance cabinet using a prepared core material, the method comprising steps of:
preparing a pre-densified insulation base using a roller compactor;
crushing the pre-densified insulation base into core insulation, using a crushing device having a plurality of crushing rollers, to define a core density of the core insulation, wherein the pre-densified insulation base and the core insulation includes powder insulating particles that are adhered together during the preparing and crushing steps;
providing an appliance structure having an outer wrapper and an inner liner, the outer wrapper and the inner liner defining an insulating cavity therebetween;
disposing the core insulation having the core density into the insulating cavity;
sealing the insulating cavity of the appliance structure to contain the core insulation therein; and
expressing at least a portion of a gas from within the insulating cavity to form a vacuum insulated structure, wherein:
the core insulation is in a form of a granular core insulation;
a binder is added to the granular core insulation; and
the binder coats a majority of an outer surface of granules of the granular core insulation and increases a compressive strength of each granule of the granular core insulation, wherein the granular core insulation is a flowable material.

10. The method of claim 9, wherein the core density of the core insulation is equivalent to a target density for the vacuum insulated structure, wherein the step of expressing at least a portion of the gas is substantially free of compression of the core insulation.

11. The method of claim 9, wherein the step of expressing at least a portion of the gas further densifies the core insulation to be compressed from the core density to a target density, wherein the target density is different than the core density.

12. The method of claim 9, wherein the core insulation is in the form of the granular core insulation, and wherein the appliance structure is metal.

13. The method of claim 9, wherein the step of preparing the pre-densified insulation base includes pre-densifying a powder insulation material into the pre-densified insulation base, and wherein pre-densifying the powder insulation material is performed by the roller compactor.

14. The method of claim 9, wherein the step of preparing the pre-densified insulation base includes blending together a plurality of insulating components, where the insulating components include at least one of silica powder, aerogel powder, insulating fibers, insulating spheres, perlite, rice husk ash, diatomaceous earth and opacifiers to form the pre-densified insulation base.

15. A method of preparing a core material for installation into an insulated structure, the method comprising steps of:
blending a plurality of insulating components to form a powder insulation material having a bulk density, wherein the insulating components include at least one of silica powder, aerogel powder, insulating fibers, insulating spheres, perlite, rice husk ash, diatomaceous earth and at least one opacifier;
pre-densifying the powder insulation material using a roller compactor to form a pre-densified insulation base; and
crushing the pre-densified insulation base using a separate roller compactor to define a core insulation having a core density, wherein the core density is different than the bulk density and the core density is in a range of from approximately 80 grams per liter to approximately 350 grams per liter, wherein:
the core density of the core insulation is greater than the bulk density of the powder insulation material;
the core insulation is in a form of a granular core insulation;

the pre-densified insulation base, the core insulation and the granular core insulation includes particles of the powder insulation material that are adhered together during the preparing and crushing steps;

a binder is added to the granular core insulation; and the binder coats granules of the granular core insulation and increases a compressive strength of each granule of the granular core insulation.

16. The method of claim 15, wherein the bulk density is defined by a density within a range of from approximately 30 grams per liter to approximately 150 grams per liter.

17. The method of claim 15, further comprising steps of:

disposing the core insulation into an interior cavity of the insulated structure;

sealing the insulated structure; and expressing gas from the interior cavity to further densify the core insulation to define a target density, wherein a vacuum insulated structure is defined by the insulated structure having the core insulation defining the target density.

18. The method of claim 17, wherein the insulated structure is a vacuum insulated panel.

19. The method of claim 17, wherein the insulated structure is an appliance cabinet, wherein the core insulation having the core density is disposed directly into the interior cavity.

* * * * *